US011061041B1

(12) United States Patent
Grumski et al.

(10) Patent No.: US 11,061,041 B1
(45) Date of Patent: Jul. 13, 2021

(54) SYSTEM, METHOD, AND APPARATUS FOR VERIFIABLE MATERIALS TESTING

(71) Applicant: Forney, L.P., Zelienople, PA (US)

(72) Inventors: Scott M. Grumski, Zelienople, PA (US); Mark Stafura, Zelienople, PA (US); Matthew Henry, Zelienople, PA (US); Jeffrey P. Dziki, Zelienople, PA (US)

(73) Assignee: Forney, L.P., Zelienople, PA (US)

( * ) Notice: Subject to any disclaimer, the term of this patent is extended or adjusted under 35 U.S.C. 154(b) by 295 days.

(21) Appl. No.: 16/152,464

(22) Filed: Oct. 5, 2018

Related U.S. Application Data

(60) Provisional application No. 62/568,386, filed on Oct. 5, 2017.

(51) Int. Cl.
*G01N 35/00* (2006.01)
*G06Q 50/26* (2012.01)

(52) U.S. Cl.
CPC ....... *G01N 35/00871* (2013.01); *G06Q 50/26* (2013.01); *G01N 2035/0091* (2013.01); *G01N 2035/00881* (2013.01)

(58) Field of Classification Search
CPC ..... G01N 35/00871; G01N 2035/0091; G01N 2035/00881; G06Q 50/26
See application file for complete search history.

(56) References Cited

U.S. PATENT DOCUMENTS

| 5,712,431 | A | * | 1/1998 | Vilendrer | ................. G01N 3/24 73/841 |
|---|---|---|---|---|---|
| 6,826,498 | B2 | | 11/2004 | Birkner et al. | |
| 7,149,701 | B2 | | 12/2006 | McKinney | |
| 7,331,242 | B2 | | 2/2008 | Kim | |
| 8,819,493 | B1 | * | 8/2014 | Gaudette | ............... G06F 11/263 714/33 |
| 8,825,423 | B1 | | 9/2014 | Brovold | |
| 2008/0249729 | A1 | | 10/2008 | Martinez et al. | |
| 2008/0275714 | A1 | | 11/2008 | Martinez | |
| 2016/0223513 | A1 | | 8/2016 | Belangie | |
| 2017/0102304 | A1 | | 4/2017 | Saleem | |
| 2017/0108456 | A1 | | 4/2017 | Alizadeh et al. | |
| 2017/0212094 | A1 | | 7/2017 | Radjy | |
| 2017/0219553 | A1 | * | 8/2017 | Radjy | .................... G01N 25/00 |

* cited by examiner

*Primary Examiner* — Tarun Sinha
*Assistant Examiner* — Lal C Mang
(74) *Attorney, Agent, or Firm* — The Webb Law Firm

(57) ABSTRACT

Provided is a system for testing a material, including a testing device configured to apply a physical test to a material and including sensors configured to measure parameters of the material, at least one processor in communication with the testing device programmed or configured to: select a test specimen, automatically set-up the testing device for at least one test, generate test data based at least partially on the parameters measured by the sensors, and communicate the test data to a remote system, at least one server computer remote from the testing device and the at least one processor, the at least one server computer programmed or configured to: send specimen and test parameter data, receive the test data and store the test data in a database in association with at least one identifier that uniquely identifies the testing device, and prevent modification of the test data stored in the database.

21 Claims, 15 Drawing Sheets

SYSTEM, METHOD, AND APPARATUS FOR VERIFIABLE MATERIALS TESTING

CROSS REFERENCE TO RELATED APPLICATION

This application claims priority to U.S. Provisional Patent Application No. 62/568,386, filed Oct. 5, 2017, entitled "System, Method, and Apparatus for Verifiable Materials Testing," the entire disclosure of which is hereby incorporated by reference.

BACKGROUND

1. Field

This disclosure relates generally to materials testing and, in one non-limiting embodiment, to a system, method, and apparatus for verifiable materials testing.

2. Technical Considerations

Certain materials, such as concrete, are subject to mandatory testing by governmental and regulatory entities. Such testing often involves subjecting a sample of material to one or more forces and measuring the response of the sample. Typically, individuals carrying out such testing log the results in a written report. Such results and reports are often inaccurate, suffering from improper testing protocol, inaccurate logging, misplaced or fraudulent entries, and the like. These inaccuracies cannot be subsequently revealed by reviewing final test reports. Stakeholders have an interest in knowing that the testing was completed in a timely and accurate manner, and that the results are verifiable.

SUMMARY

According to a non-limiting embodiment, provided is a system for testing a material, including: a testing device configured to apply at least one physical test to a piece of material comprising material properties, the testing device comprising a plurality of sensors configured to measure parameters of the material subjected to the at least one physical test; at least one processor in communication with the testing device, the at least one processor programmed or configured to: select or receive a selection of a test specimen comprising the material, automatically set-up the testing device for at least one test based on input data communicated from a remote system, generate test data based at least partially on the parameters measured by the plurality of sensors, and communicate the test data to a remote system; and at least one server computer remote from the testing device and the at least one processor, the at least one server computer configured to: receive the input data from a client device, the input data including at least one of specimen data and testing parameter data, communicate the input data to the testing device, receive the test data from the testing device and store the test data in a database in association with at least one identifier that uniquely identifies the testing device, and prevent modification of the test data stored in the database.

In non-limiting embodiments, the at least one server computer is further configured to generate at least one report based at least partially on the test data. In non-limiting embodiments, the at least one report comprises at least one machine-readable indicia, and the at least one machine-readable indicia comprises a link to a portal providing access to the at least one report and/or the test data. In non-limiting embodiments, the test data comprises at least one of the following: raw sensor data, processed sensor data, a material property of the material, a testing parameter, or any combination thereof. In non-limiting embodiments, the test data comprises at least one material property of the material and at least one testing parameter, and the at least one testing parameter comprises: a time period, a force, a temperature, or any combination thereof. In non-limiting embodiments, the at least one server computer is further programmed or configured to provide access to the test data only to users having valid credentials. In non-limiting embodiments, the at least one server computer is further programmed or configured to prevent modification of the test data. In non-limiting embodiments, the at least one server computer is further programmed or configured to provide an Application Programming Interface (API) to allow access to the test data through a third-party application. In non-limiting embodiments, the at least one server computer prevents modification of the test data stored in the database by preventing all users from modifying the test data or preventing users without authorized credentials from modifying the test data. In non-limiting embodiments, the testing device further includes: a chamber adapted to receive the piece of the material; a piston arranged at least partially in the chamber; and a contact surface coupled to the piston and configured to apply a force to the piece of material in the chamber. In non-limiting embodiments, the at least one server computer is further programmed or configured to: receive the input data from a client device, the input data comprising at least one of specimen data and testing parameter data; store the input data in the database or another database; and communicate the input data to the at least one processor in communication with the testing device. In non-limiting embodiments, the remote system comprises the at least one server computer.

According to another non-limiting embodiment, provided is a testing device, including: a chamber adapted to receive a sample specimen of a material; a testing mechanism arranged at least partially in the chamber and configured to apply at least one physical test to the sample specimen; at least one sensor arranged in the chamber and configured to detect at least one test result parameter of the sample specimen while the at least one physical test is being applied; a network interface; and at least one processor in communication with the at least one sensor and the network interface, the at least one processor programmed or configured to: cause the testing mechanism to apply the at least one physical test to the sample specimen; receive the at least one test result parameter from the at least one sensor; generate test data comprising the at least one testing result parameter, at least one testing parameter, and at least one material parameter; and communicate, with the network interface, the test data to a remote system comprising a secure data storage device such that the test data is stored as read-only and is accessible based on user credentials. In non-limiting embodiments, the at least one processor is further programmed or configured to generate a unique security identifier and associate the unique security identifier with the test data before communicating the test data to the remote system.

According to another non-limiting embodiment, provided is a system for testing a material, comprising: means for applying at least one physical test to a piece of material; means for measuring at least one material property while applying the at least one physical test to the piece of the material; means for analyzing the at least one material property; and means for receiving and securely storing the at least one material property in a database, such that the database cannot be modified without permission. In non-limiting embodiments, the system further includes report generating means for generating a report based on test data comprising the at least one material property.

According to another non-limiting embodiment, provided is a method for verifiable materials testing, including: positioning a piece of material within a testing device, the piece of material comprising material properties; applying at least one physical test with the testing device to the piece of material; automatically measuring a plurality of parameters of the piece of material while the at least one physical test is being applied; generating at least one network packet based on the plurality of parameters; communicating the at least one network packet to a remote system; storing the plurality of parameters and/or test data derived from the plurality of parameters in a remote secure database; selectively allowing access to the plurality of parameters and/or the test data from the remote secure database; and preventing modification of the plurality of parameters and/or the test data in the remote secure database.

According to non-limiting embodiments, the method further includes generating at least one report based at least partially on the test data. In non-limiting embodiments, the at least one report comprises at least one machine-readable indicia, and the at least one machine-readable indicia comprises a link to a portal providing access to the at least one report and/or the test data. In non-limiting embodiments, the test data comprises at least one of the following: raw sensor data, processed sensor data, a material property of the material, a testing parameter, or any combination thereof. In non-limiting embodiments, the test data comprises at least one material property of the material and at least one testing parameter, and wherein the at least one testing parameter comprises: a time period, a force, a temperature, or any combination thereof. In non-limiting embodiments, the method further includes preventing modification of the plurality of parameters and/or the test data in the remote secure database comprises preventing all users from modifying the test data. In non-limiting embodiments, preventing modification of the plurality of parameters and/or the test data in the remote secure database comprises preventing users without authorized credentials from modifying the test data. In non-limiting embodiments, the method further includes automatically configuring the testing device based on data received from the remote system, the data comprising at least one of specimen data and testing parameter data, wherein the data is input or selected by a user through a graphical user interface, and wherein the data comprises physical properties of the sample specimen. In non-limiting embodiments, the method further includes receiving test data from at least one other test from the remote system, the at least one other test corresponding to at least one sample specimen from a same set of sample specimens that includes the piece of material, and displaying, on at least one graphical user interface, the test data from the at least one other test.

These and other features and characteristics of the present invention, as well as the methods of operation and functions of the related elements of structures and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and the claims, the singular form of "a," "an," and "the" include plural referents unless the context clearly dictates otherwise.

BRIEF DESCRIPTION OF THE DRAWINGS

FIGS. 4A-4F illustrate graphical user interfaces for a testing device according to non-limiting embodiments;

DESCRIPTION OF THE PREFERRED EMBODIMENTS

Figure 1:
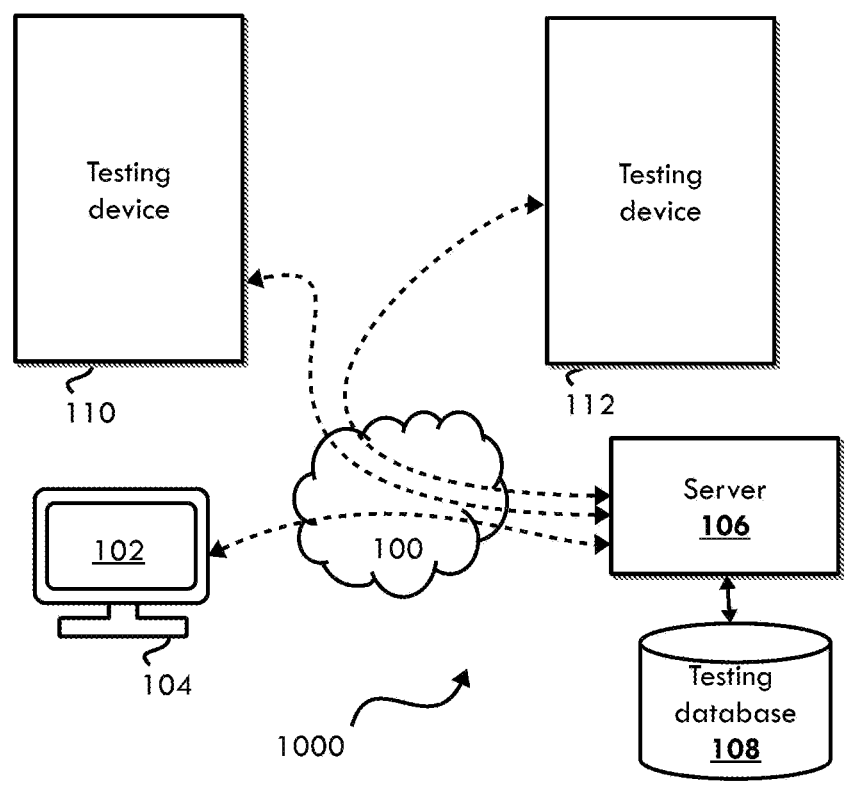
FIG. 1 illustrates a system for verifiable materials testing according to a non-limiting embodiment.

For purposes of the description hereinafter, the terms "end," "upper," "lower," "right," "left," "vertical," "horizontal," "top," "bottom," "lateral," "longitudinal," and derivatives thereof shall relate to the invention as it is oriented in the drawing figures. However, it is to be understood that the invention may assume various alternative variations and step sequences, except where expressly specified to the contrary. It is also to be understood that the specific devices and processes illustrated in the attached drawings, and described in the following specification, are simply exemplary embodiments or aspects of the invention. Hence, specific dimensions and other physical characteristics related to the embodiments or aspects disclosed herein are not to be considered as limiting.

As used herein, the terms "communication" and "communicate" may refer to the reception, receipt, transmission, transfer, provision, and/or the like, of information (e.g., data, signals, messages, instructions, commands, and/or the like). For one unit (e.g., a device, a system, a component of a device or system, combinations thereof, and/or the like) to be in communication with another unit means that the one unit is able to directly or indirectly receive information from and/or transmit information to the other unit. This may refer to a direct or indirect connection (e.g., a direct communication connection, an indirect communication connection, and/or the like) that is wired and/or wireless in nature. Additionally, two units may be in communication with each other even though the information transmitted may be modified, processed, relayed, and/or routed between the first and second unit. For example, a first unit may be in communication with a second unit even though the first unit passively receives information and does not actively transmit information to the second unit. As another example, a first unit may be in communication with a second unit if at least one intermediary unit (e.g., a third unit located between the first unit and the second unit) processes information received from the first unit and communicates the processed information to the second unit. In some non-limiting embodiments, a message may refer to a network packet (e.g., a data packet and/or the like) that includes data. It will be appreciated that numerous other arrangements are possible.

As used herein, the term "testing device" refers to a machine used to subject a sample specimen of material to one or more physical tests and to measure the response of the sample. For example, a testing device may include a machine designed to test one or more of the following: compression of a material, flexural properties of a material, tension of a material, resistance to temperature, and/or other tests affecting the material properties. A physical test may include, for example, an application of a force, an application of a temperature or temperature change, application of at least one excitation (e.g., light stimulation, electrical stimulation, etc.), and/or the like. A testing device may include the machine used to subject a physical test to the material, one or more sensors to measure the response, and may also include one or more control systems for operating the machine and one or more graphical user interfaces for operating the control system(s) and/or machine. Non-limiting examples of testing devices include the Forney VFD and ForneyLink/BreakMaster series products. In addition to automatic control systems, non-limiting embodiments may be used through manual control and operation of testing devices. The term "sample specimen," as used herein, refers to a piece of material having properties that are tested with a testing device. For example, a sample specimen may include a concrete cylinder or brick or any other type of material having any shape or size capable of being tested by a testing device.

A testing device may be configured to communicate with one or more remote systems to implement non-limiting embodiments of a system, method, and apparatus for verifiable materials testing. Not only may a testing device communicate data obtained through one or more tests, but a testing device may also locally store test data, receive configuration data from a remote system, receive control signals from a remote system or local device, calibrate itself based on historical data in a remote system, and/or the like. In some non-limiting embodiments, the testing device includes memory to locally store test data that is concurrently or subsequently communicated to a remote system for storage. Test data may be communicated to such remote systems in real-time, at intervals, in batches, and/or in any other like manner.

The term "test data," as used herein, refers to data generated and/or collected by a testing device as well as data that is derived from data generated and/or collected by a testing device and data about the testing device itself. Test data may include specimen data (e.g., values for parameters concerning one or more sample specimens being tested and/or one or more material properties of such specimen(s), such as material type, material or specimen creation date, expected material strength, specimen size, specimen identifier, specimen dimensions, specimen weight, and/or the like), testing parameter data (e.g., data about one or more tests performed on a sample specimen, such as testing force, testing temperature, testing time, testing error information, and/or the like), testing device data (e.g., data about the testing device, such as device identifier, user identifier, facility identifier, calibration information, and/or the like), and test result data (e.g., data resulting from one or more tests on one or more sample specimens, such as fracture type, application of pressure rate, maximum load, maximum stress, tensile strength, and/or the like). Test data may include one or more of the following parameters: device identifier, user identifier, facility identifier, project identifier, customer identifier, location identifier, lab identifier, specimen number, specimen size, set number, age to break (schedule of tests), sample collection date, specimen identifier, length dimensions, diameter dimensions, expected strength (e.g., in psi or other pressure units) of a set or sample, testing time, testing date, test type, test identifier, testing result, testing force, testing temperature, error codes, correction factor, calibration information, fracture type, application of pressure rate, maximum load, maximum stress, tensile strength, and/or other like information collected before, during, and after the testing of a sample specimen. Test data may also include raw sensor data and/or processed sensor data.

Non-limiting embodiments are directed to a system and method for verifiable materials testing that greatly improves the efficiency, accuracy, and reliability of construction material laboratory testing efforts, as well as provides transparency for relevant parties. Through the unique arrangement of testing devices in network communication with a remote, "cloud" secure data storage device and a server computer for controlling access to the test data, an efficient use of computing resources is achieved over previous testing and reporting methods involving the translation of test data and manual input of test data into a database. Moreover, through central control of test data for numerous testing devices, facilities, and users, non-limiting embodiments prevent unauthorized modification of test data such that audits and report generation for regulatory compliance or other requirements are possible. Non-limiting embodiments allow for forensic analysis of a previously-completed test based on historical data and the creation of an audit trail, which is not possible with existing testing devices or systems for operating them.

Referring to FIG. 1, a system 1000 for verifiable materials testing is shown according to a non-limiting embodiment. A first testing device 110 and a second testing device 112 are in communication with a server computer 106 through a network environment 100. It will be appreciated that one or more testing devices may be utilized within the system 1000, and that two testing devices are shown in FIG. 1 for example purposes only. Multiple testing devices 110, 112 may be distributed in multiple locations, such as a main laboratory, a field laboratory, and/o the like. Moreover, it will be appreciated that one or more different network environments 100 may be used to facilitate communication. For example, the network may be a local area network (LAN), a wide area network (WAN), a public network (e.g., the Internet or other public network), and/or a private network. Accordingly, the server computer 106 may be located in the same building as the testing devices 110, 112 or may be located remotely from the testing devices 110, 112.

In non-limiting embodiments, the testing devices 110, 112 may be in direct communication with a local computer, such as a server computer arranged in the same facility as the testing devices 110, 112, that is in communication with a remote server computer 106 via the network environment. Moreover, in non-limiting arrangements in which the server computer 106 is remote and the network environment 100 is the Internet, the testing devices 110, 112 may communicate with the network environment 100 through a local network, such as a local wireless or wired network that connects to the network environment 100 through a gateway device. In other non-limiting embodiments, the testing devices 110, 112 may communicate directly with the server computer 106 through a built-in modem. Various other arrangements are possible for establishing communication between the testing devices 110, 112 and the server computer 106.

Still referring to FIG. 1, in non-limiting embodiments the testing devices 110, 112 may communicate test data to the server computer 106. The test data may be communicated in real-time, at predefined intervals, in batches, and/or in any other like manner. In some examples, the test data communicated to the server computer 106 may include raw sensor data. In other examples, the test data communicated to the server computer 106 may be generated from processed sensor data. The test data may also include a combination of raw and processed sensor data. The server 106, in response to receiving test data, may store the test data in a test database 108. The test database 108 may be a secure, read-only database that prevents users from modifying the test data after it has been recorded. In some examples, only privileged (e.g., administrative) users may modify the test data in the test database 108.

With continued reference to FIG. 1, in non-limiting embodiments a client device 104 may also be in communication with the server computer 106. The client device 104 may include, for example, a computing device such as a laptop, personal computer, smartphone, wearable device, and/or the like. The client device 104 may display one or more graphical user interfaces (GUIs) 102 to allow a user to interact with the server computer 106. In some examples, the GUI 102 may be a web-based portal through which the user logs-in with user credentials, such as a user name and password. The GUI 102 may also be a standalone software application. A user operating the client device 104 may input credentials into the GUI 102 to access the server computer 106. The server computer 106 may return test data corresponding to the user's credentials (e.g., test data corresponding to a testing device or facility associated with that user). Through the GUI 102, the user may view the test data in various ways, output the test data, and/or generate reports based on the test data. The client device 104 may also display the test data in response to scanning a machine-readable indicia, such as a barcode or RFID tag. In such examples, the indicia may include a link, such as a URL, that the client device 104 may request in order to present the test data. It will be appreciated that various other arrangements are possible.

In non-limiting embodiments, and with continued reference to FIG. 1, the communication between the testing devices 110, 112 and server computer 106 may be bidirectional such that test data can be synchronized between the testing devices 110, 112 and the data storage device the test database 108. For example, specimen data and testing parameters (e.g., test set-up data) may be input through the GUI 102 on the client device 104 and communicated to the server computer 106 for storage in the data storage device including 108. The data may include, for example, information input or received about one or more specimen samples that are to be tested. The data may also include information that controls one or more aspects of the test. The specimen data and/or testing parameters may then be communicated from the server computer 106 to the testing devices 110, 112. The testing devices 110, 112 may be programmed to automatically configure themselves based on the testing parameters and/or specimen data received. Moreover, the testing devices 110, 112 may compare historic or expected test data with real-time test results to display to a user an error, status, or other indication about the test.

Figure 2:
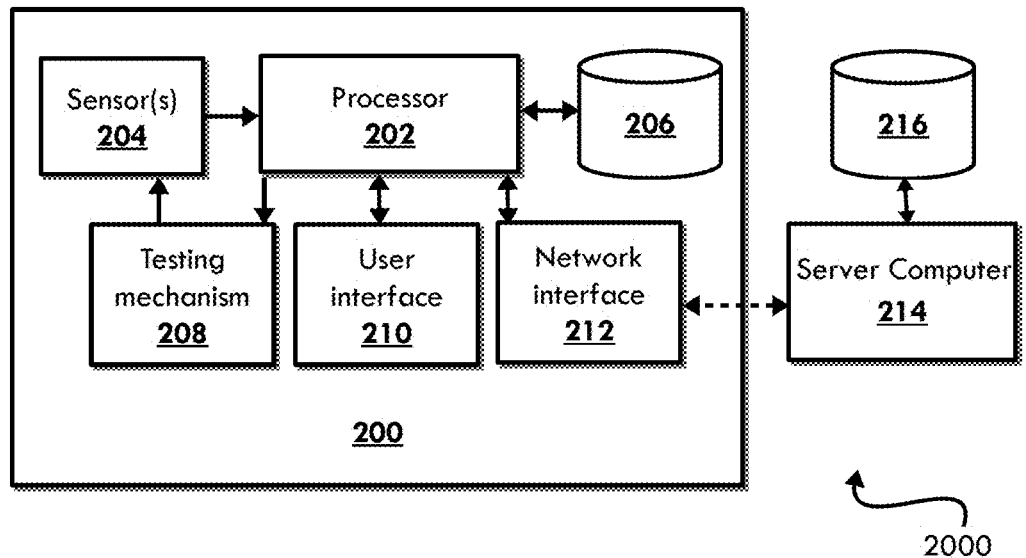
FIG. 2 illustrates a system for verifiable materials testing according to a non-limiting embodiment.

Referring now to FIG. 2, a system 2000 for verifiable materials testing is shown according to a non-limiting embodiment. A testing device 200 is shown to include a processor 202 in communication with one or more sensors 204, data storage device 206, a testing mechanism 208, a user interface 210, and a network interface 212. It will be appreciated that a testing device 200 may include fewer or additional components than that shown in FIG. 2. The processor 202 controls the testing mechanism 208 to, for example, initiate the application of a physical test on a material sample. The testing mechanism 208 may include a pressurized piston or rod, one or more gears, one or more springs or coils, and/or other like mechanisms for applying a type of force to a material. The testing device 200 may include a chamber adapted to receive a sample specimen of a material, a testing mechanism arranged in the chamber, and a contact surface coupled to the piston and configured to apply a force to the sample specimen in the chamber. The sensor 204 may be arranged in the chamber to detect one or more properties of the sample specimen as it is being tested. The processor 202 may receive commands from a user interface 210, which may include a display device and an input device (e.g., a mouse, keyboard, keypad, touchscreen, or the like) integrated with or in communication with the testing device 200. The processor 202 may also receive commands from an external control system, such as one or more computers in communication with the processor via the network interface 212.

With continued reference to FIG. 2, the processor may receive sensor data from the sensor(s) 204 that is obtained from the application of the testing mechanism 208. The sensor data may include raw data that is processed by the processor 202 to determine measurements or, in other examples, may be preprocessed by a separate processor (not shown in FIG. 2) associated with the sensor(s) 204. The processor 202 may then store test data, which may include the raw sensor data and/or measurement data as a result of processing the sensor data, in the data storage device 206. The data storage device 206 may include, for example, memory and/or a hard drive for storing test data. In non-limiting embodiments, the data storage device 206 may store test data in a relational database. The processor 202 may also communicate the test data to a server computer 214 via the network interface 212. The server computer 214, in turn, stores the test data in a secure data storage device 216.

Still referring to FIG. 2, the testing device 200 may be associated with a unique identifier, such as a device identifier, that differentiates it from other testing devices. The testing device 200 may also be associated with other identifiers, such as a user identifier, a facility identifier, and/or the like. These identifiers may be stored in the data storage device 206 or other memory of the testing device 200. In non-limiting embodiments, the unique identifier for the testing device 200 may be stored in association with the test data and be used to identify the testing device 200 when communicating data to an external system, such as the server computer 214. Other data, such as a user identifier, may be associated with a particular user of the testing machine 200. As an example, a user may enter credentials, such as a user name and password, into a user interface 210 to operate the testing device 200. The test data that results from such a session may be stored in association with a user identifier for that particular user. The server computer 214 may store the test data in the secure data storage device 216. In non-limiting embodiments, the server computer 214 and/or testing device 200 synchronizes the test data stored on the data storage device 206 of the testing device 200 with the secure data storage device 216 in communication with the server computer 214. In some non-limiting embodiments, the secure data storage device 216 stores test data in the same format and structure as the test data stored on the data storage device 206. It will be appreciated that the secure data storage device 216 may be any type of remote data storage, such as but not limited to a "cloud"-based storage array.

In non-limiting embodiments, test data stored in the secure data storage device 216 may be read-only such that the test data cannot be modified or edited. In non-limiting embodiments, the test data may require authorized credentials to be modified or edited such that only authorized users can make changes. Accordingly, in non-limiting embodiments, users of the testing device 200 may be unable to modify or edit the test data that results from one or more tests of the testing device 200. The test data may be stored in the secure data storage device 216 automatically and without an opportunity for modifying or editing the same. Further, in non-limiting embodiments where authorized users can edit or modify the test data, an access log and/or change log may be recorded to keep track of which users made which changes. In some non-limiting embodiments, test data may be encrypted from the testing device 200 to be communicated to the server computer 214 and/or secure data storage device 216. The test data may be encrypted using one or more encryption keys and one or more encryption algorithms.

In non-limiting embodiments, and with continued reference to FIG. 2, the communication between the server computer 214 and testing device 200 may be bidirectional such that test data can be synchronized between the data storage device 206 on-board the testing device 200 and the secure data storage device 216 in communication with the server computer 214. For example, the testing device 200 may periodically download test data pertaining to that testing device, facility, user, or material. In this way, the testing device 200 can compare historic or expected test data with real-time test results to display to a user an error, status, or other indication about the test. In non-limiting embodiments, test data may be communicated from the testing device 200 to the server computer 214 and/or from the server computer to the testing device 200 at intervals, periodically, or in response to an event (e.g., a test, a request, etc.).

Figure 3:
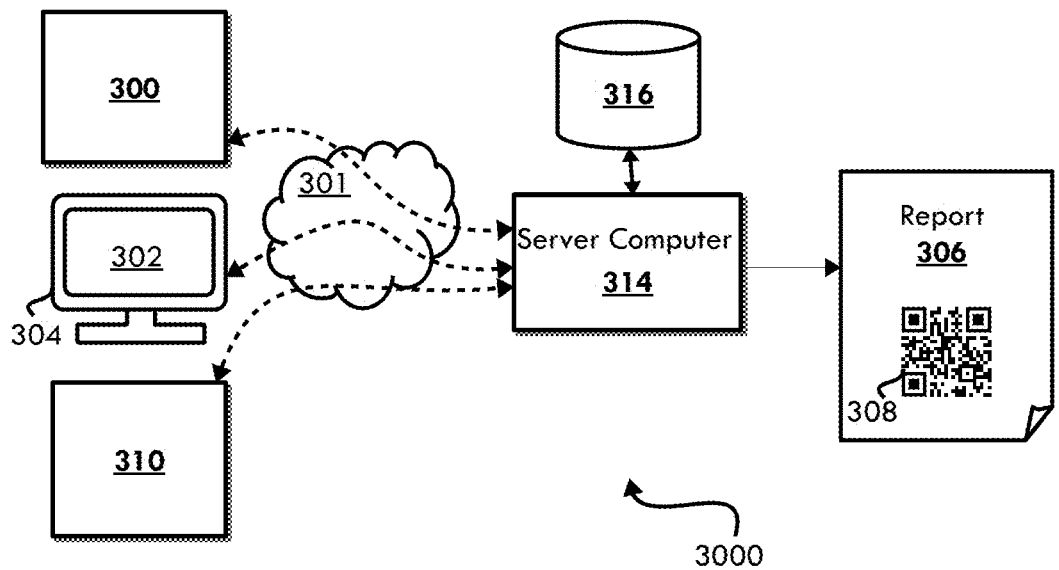
FIG. 3 illustrates a system for verifiable materials testing according to a non-limiting embodiment.

Referring now to FIG. 3, a system 3000 for verifiable materials testing is shown according to a non-limiting embodiment. A testing device 300 is in communication with a server computer 314 via a network environment 301. A client device 304 with a GUI 302 is also in communication with the server computer 314. The server computer 314 is in communication with a secure data storage device 316 including test data resulting from tests conducted by the testing device 300. One or more reports 306 may be generated by the server computer 314 in response to one or more queries or requests received from the GUI 302 of the client device 304 or elsewhere. In non-limiting embodiments, a user requesting to access test data through the client device 304 is first authenticated at the server computer 314 based on user credentials or by any other mechanism. The user credentials may be associated with test data that a particular user or group of users is allowed to access and request reports for. Reports 306 may be static documents, such as a PDF, word processing file, or image file, generated by the server computer 314 or, in other non-limiting examples, may be dynamic documents, such as a webpage that may be accessible with a credential and a network location (e.g., a URL). It will be appreciated that various other arrangements are possible.

With continued reference to FIG. 3, in non-limiting embodiments, a unique security identifier may be generated by the server computer 314 for each report 306 and/or set of test data. For example, the unique security identifier may be printed on a report 306, displayed on a GUI 302, embedded in a data carrier 308, and/or the like, and may be used to verify the accuracy of the test data. The unique security identifier may link to, or uniquely identify, a report and/or set of test data. In some examples, the unique security identifier may be generated based on the test data, user data, and/or any other available data. For example, the unique security identifier may be a hash value calculated by processing a predefined set of input parameters with a hash algorithm, such that the hash value can be recreated and verified with the same set of input parameters. It will be appreciated that various other arrangements are possible. A client device 304 accessing the server computer 314 may communicate the unique security identifier (e.g., by entering through a GUI 302 or scanning a data carrier 308 including the identifier) to verify the report. The server computer 314 may recalculate the security identifier based on the same inputs to verify the accuracy of the test data on the report 306.

In non-limiting embodiments, the unique security identifier may be encoded in a data carrier 308 such as, but not limited to, a barcode (e.g., standard barcode or two-dimensional barcode (e.g., QR code)), an RFID transponder, machine-readable indicia, and/or the like. In this manner, a user may scan the data carrier 308 with a client device that includes a reader device, such as a mobile phone with a camera unit or radio frequency receiver, to extract the unique security identifier. The reader device and/or client device may then verify the unique security identifier. In some non-limiting embodiments, a data carrier 308 may also include a pointer to a network location, such as a URL for a webpage, such that the client device can be directed to the network location to verify the unique security identifier and/or to access test data associated with the data carrier 308 that is scanned.

In non-limiting embodiments, and with continued reference to FIG. 3, test data stored in the testing database 316 may be securely accessed by a Laboratory Information Management System (LIMS) 310 to allow further integration of test data into the customer's business system. An Application Programming Interface (API) may be provided by the server computer 314 to allow for integration into a LIMS 310. For example, an API may map parameters of the test data in the secure data storage device 316 to parameters of a database used by the LIMS 310. The LIMS 310 may identify itself to the server computer 314 via credentials. An API may map one or more parameters of the test data stored in the secure data storage device 316 to parameters of a database used by the LIMS 310. The LIMS 310 may receive and/or request test data at regular intervals, in batches, in response to user request, and/or the like.

In non-limiting embodiments, and with continued reference to FIG. 3, the server computer 314 may be accessed by one or more auditing users, such as users seeking to audit the test data for one or more users, devices, facilities, materials, and/or the like. In some examples, the auditing user may be determining whether an entity is in compliance with one or more regulations, such as building and material safety regulations. In non-limiting embodiments, auditing users may have credentials to facilitate those users to request reports, generate reports, and query test data for one or more users, devices, facilities, or the like. In some non-limiting embodiments, automated alerts may be generated and communicated to an auditing user or other users in response to one or more parameters of test data satisfying a predetermined threshold. In some non-limiting embodiments, reports 306 may be automatically generated at regular time interfaces or in response to an event, such as a new test, and communicated to an auditing user or any other users.

Figure 4A:
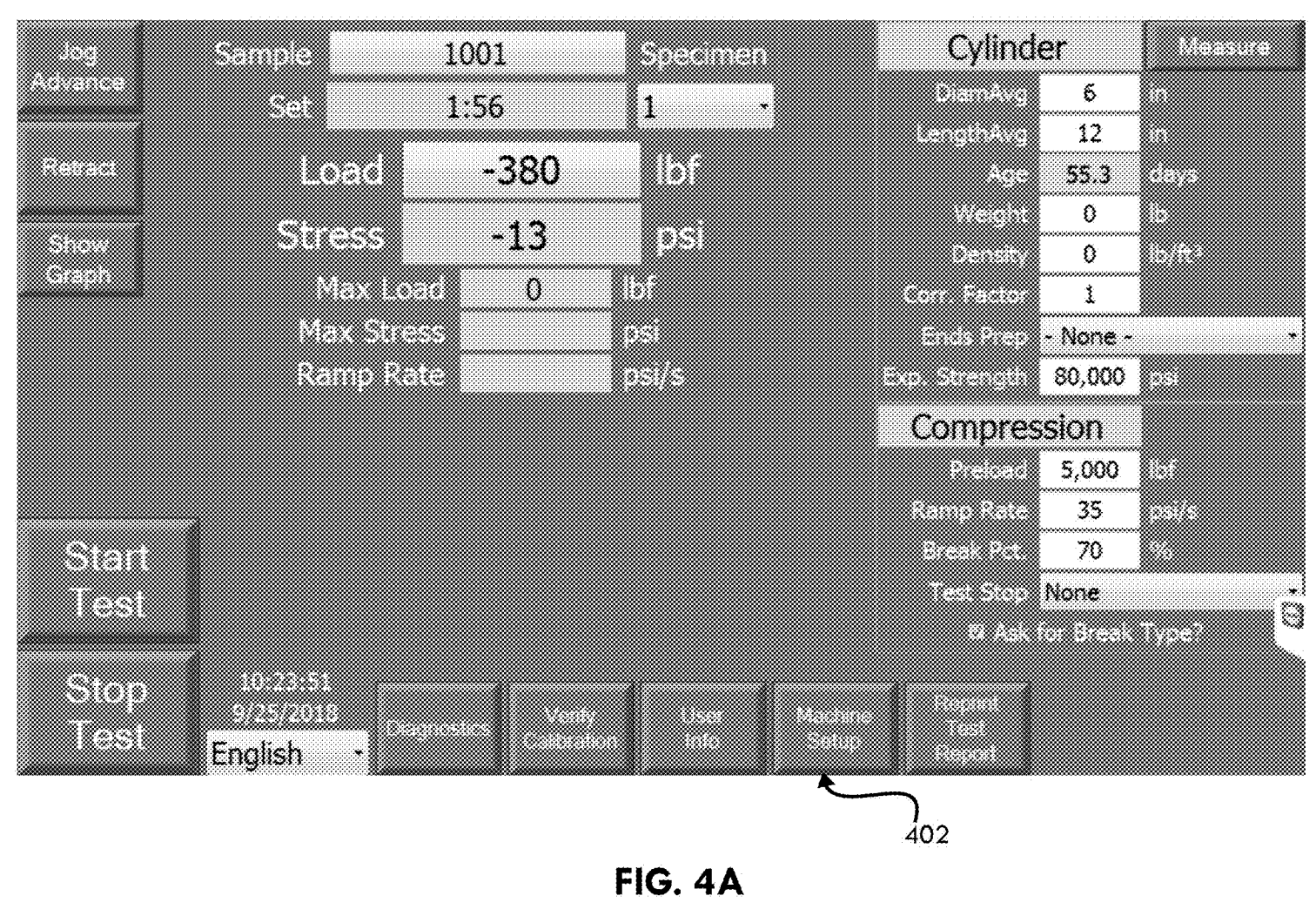
Figure 4B:
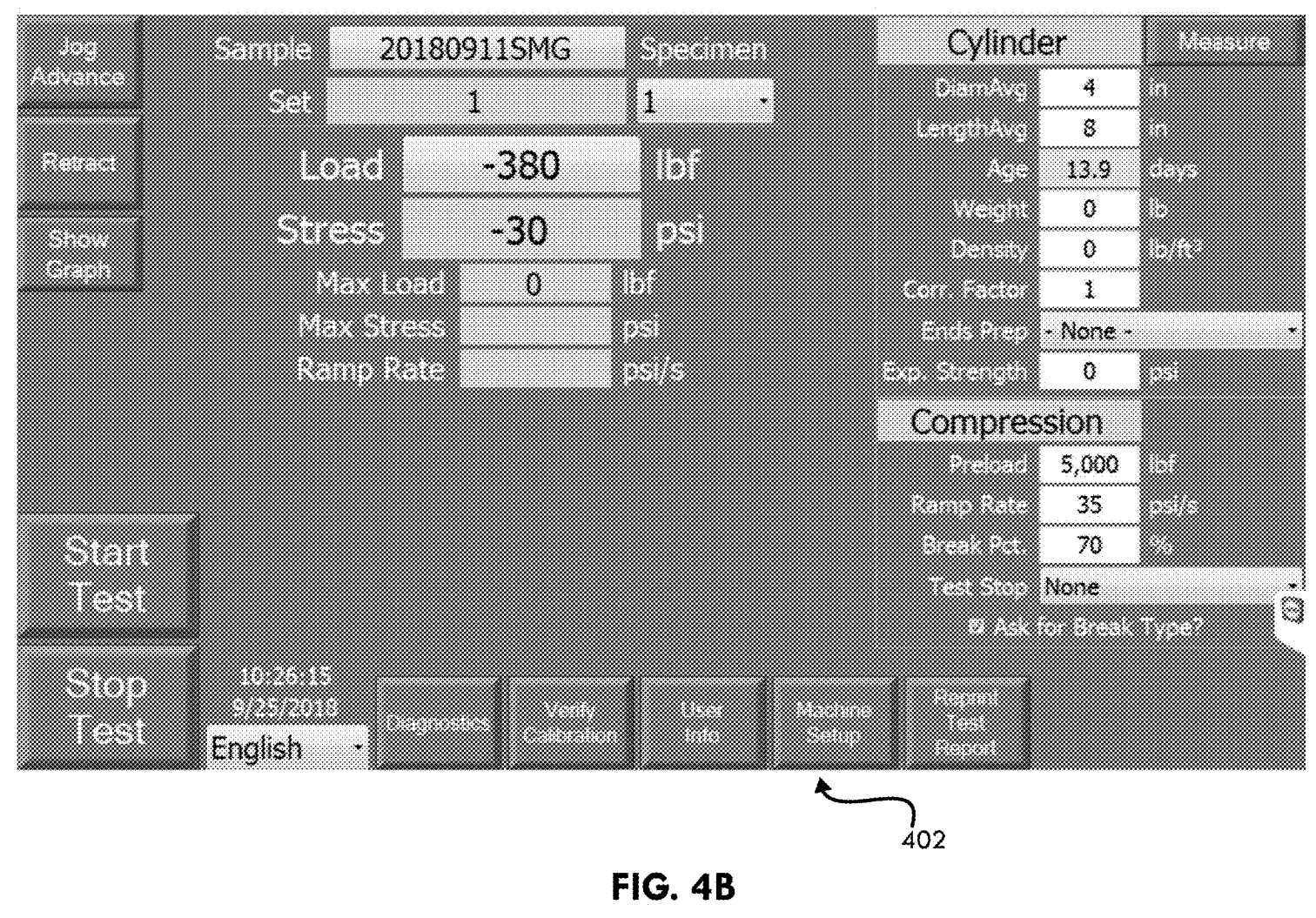
Figure 4C:
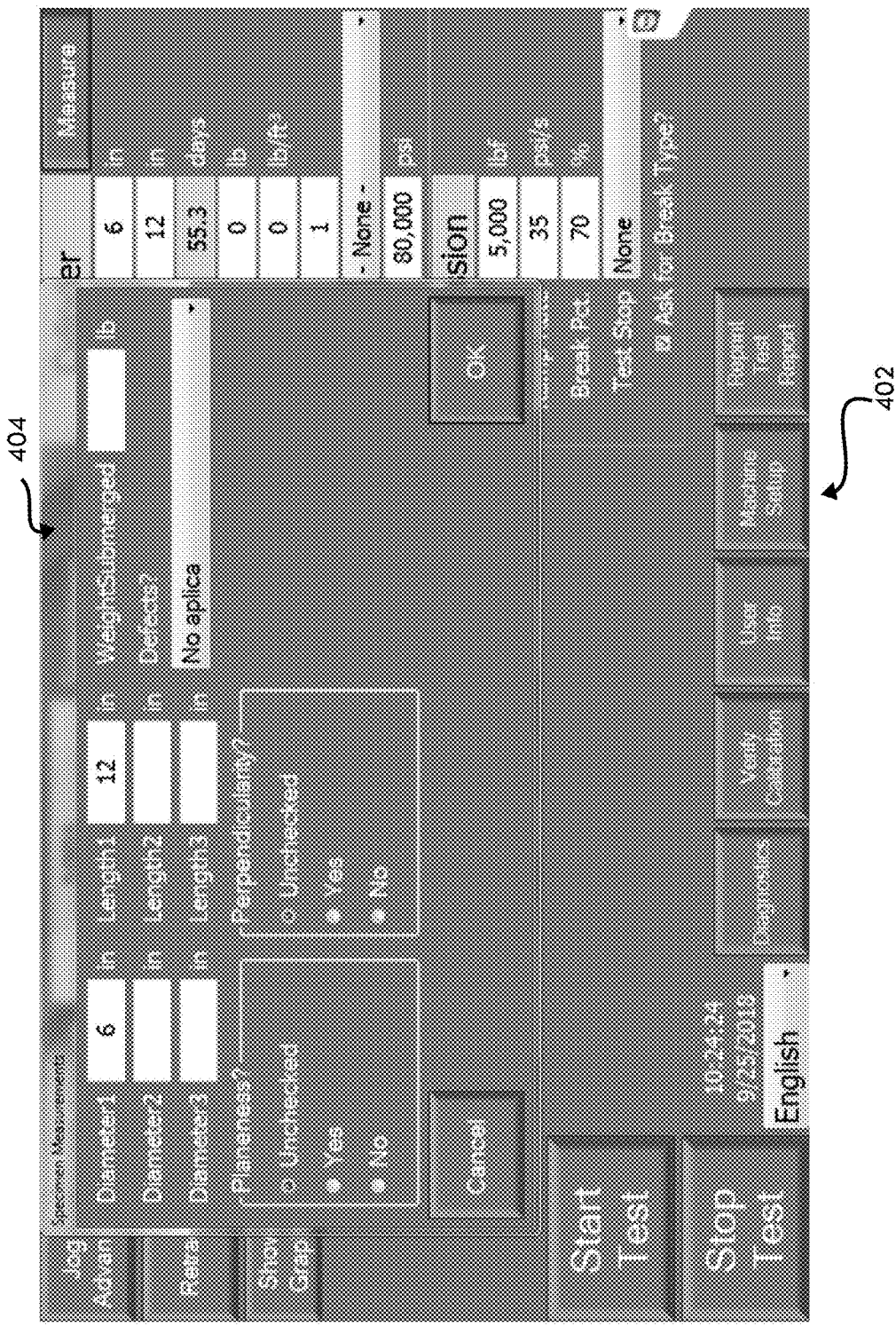

Referring to FIGS. 4A-4F, graphical user interfaces (GUIs) for a testing device are shown according to non-limiting embodiments. The GUIs shown in FIGS. 4A-4F may be displayed by the user interface 210 shown in FIG. 2 or by any other display device in communication with a testing device. FIG. 4A shows a main control interface 402 with selectable options for inputting and selecting testing parameters and sample specimen parameters. FIG. 4B shows the main control interface 402 showing a mismatch of the "age" parameter, where the box or value for the "age" parameter may be colored yellow or another color to distinguish it from other parameters. In this example, the "age" parameter does not match an existing "age" parameter that was previously downloaded from the remote system and secure data storage device. Color coding may be used elsewhere in the main control interface 402. For example, the "Max Stress" field may be color coded, e.g., red, if the strength of the material is lower than expected based on previously downloaded data.

Figure 4D:
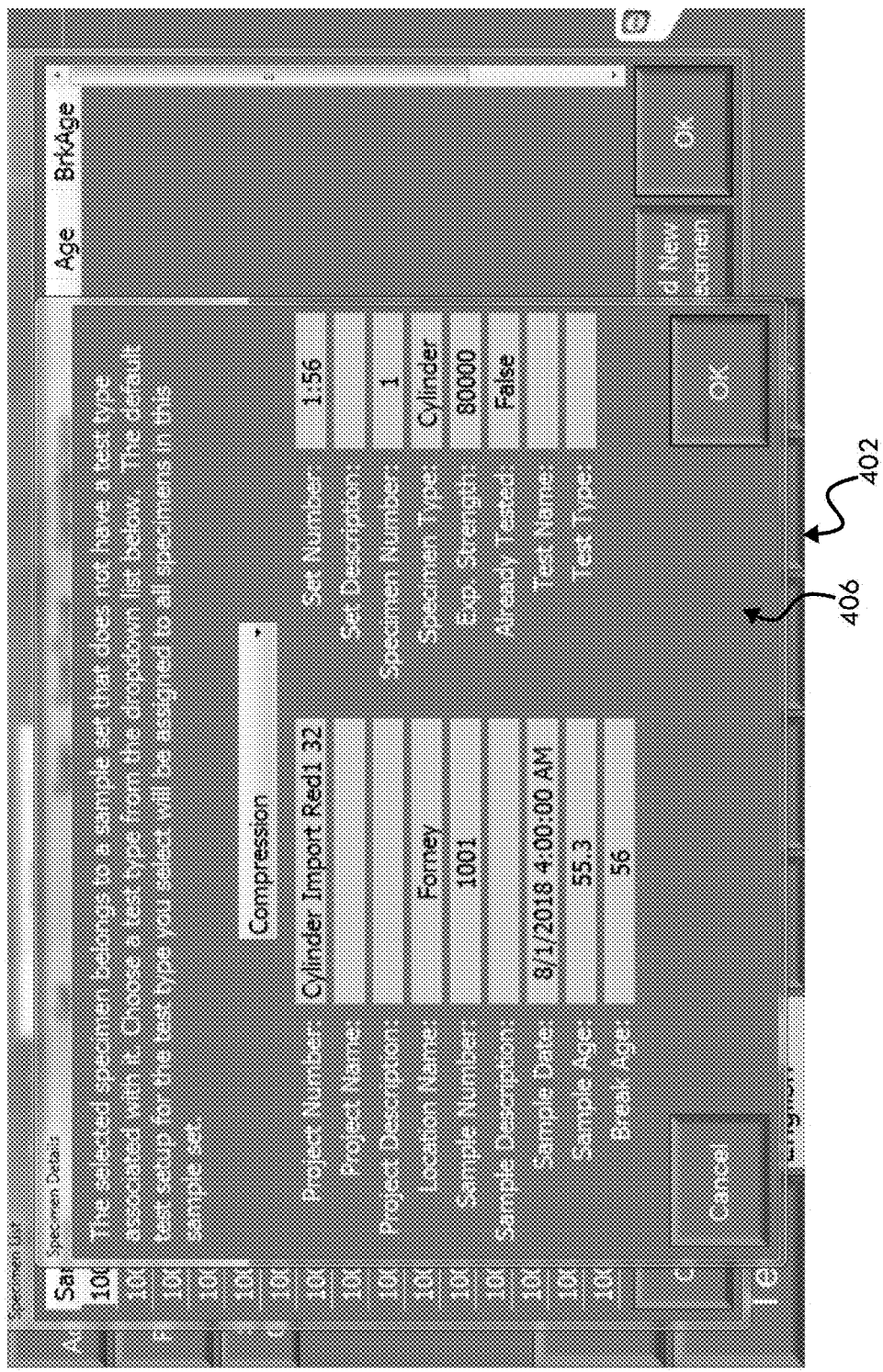

FIG. 4C shows the main control interface 402 overlaid with a specimen measurement interface 404 configured to receive user input concerning the dimensions and properties of a sample specimen to be tested by the testing device. FIG. 4D shows the main control interface 402 overlaid with a specimen details interface 406 configured to receive user input concerning the sample specimen or a set of sample specimens to be tested by the testing device. In non-limiting embodiments, the specimen details interface 406 provides information, e.g., specimen data, concerning a single sample specimen selected to be tested, and selectable options for a user to choose the type of test to be performed on that sample specimen. The testing device will perform one or more tests based at least in part on the specimen data shown or inputted into the specimen details interface 406. For example, the testing machine associated with the specimen details interface 406 may perform a compression test or a tensile-splitting test on a cylinder sample specimen. In the illustrated example, this choice of test could have been specified by configuring testing parameters through a portal in advance of the test but, as shown in FIG. 4D, the choice of test was not previously provided and therefore can be selected on the specimen details interface 406 at the testing device.

Figure 4E:
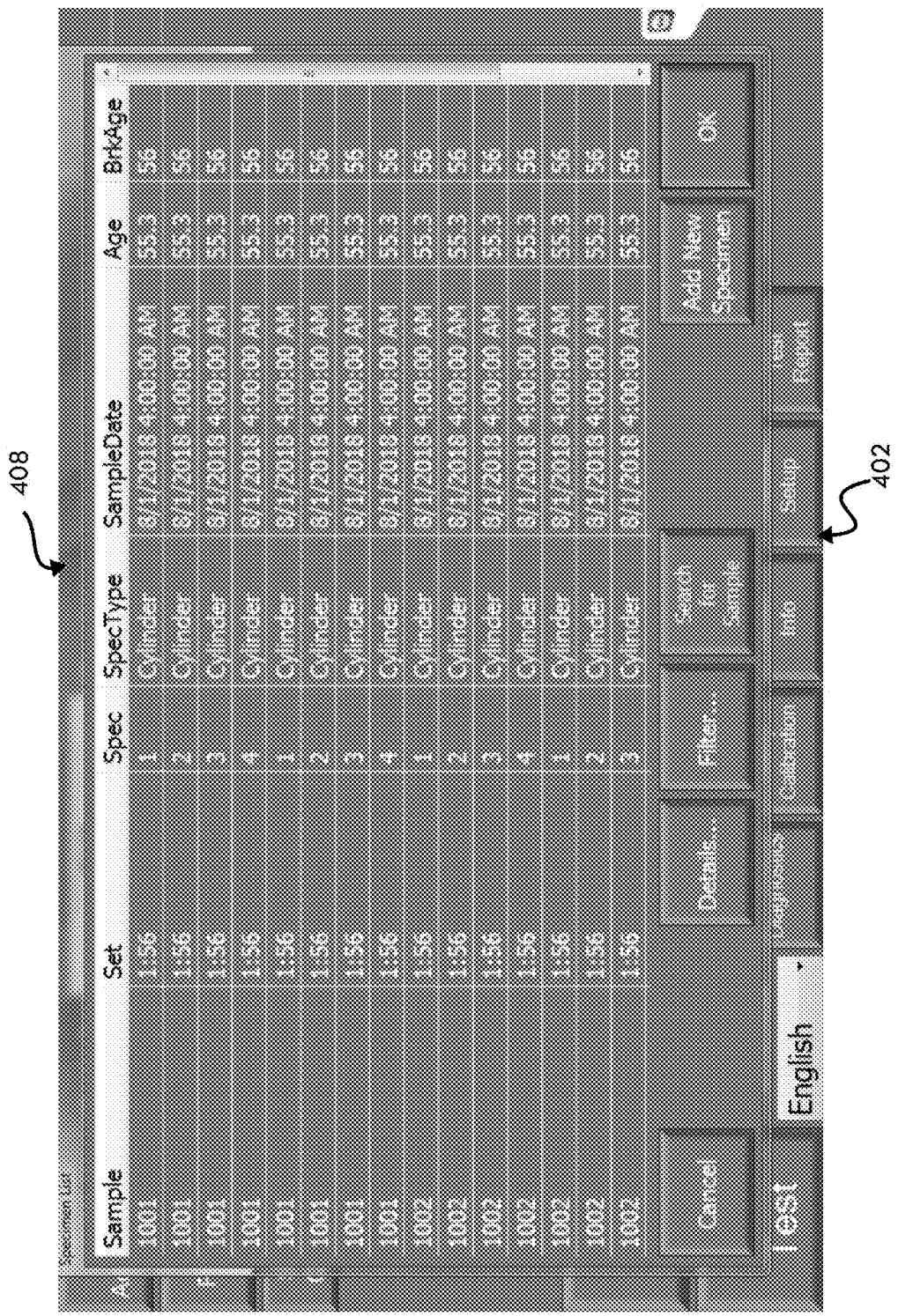

FIG. 4E shows the main control interface 402 overlaid with a specimen list interface 408 that displays test data and/or specimen data for each specimen. The specimen data shown in FIG. 4E was inputted into and/or selected through a portal and stored by a remote system prior to testing. As an example, the specimen data may have been inputted or selected on the GUI 102 shown in FIG. 1, the GUI 302 and/or LIMS 310 shown in FIG. 3, or on any other GUI displayed on a client device in communication with a remote system that, in turn, is in communication with a testing device. On FIG. 4E, the user operating the testing machine chooses the specimen to be tested from the specimen list interface 408. The specimen data for the selected sample specimen may be shown, for example, on the main control interface 402 shown in FIG. 4A. The specimen data and other test data may be edited and/or modified on the main control interface 402.

Figure 4F:
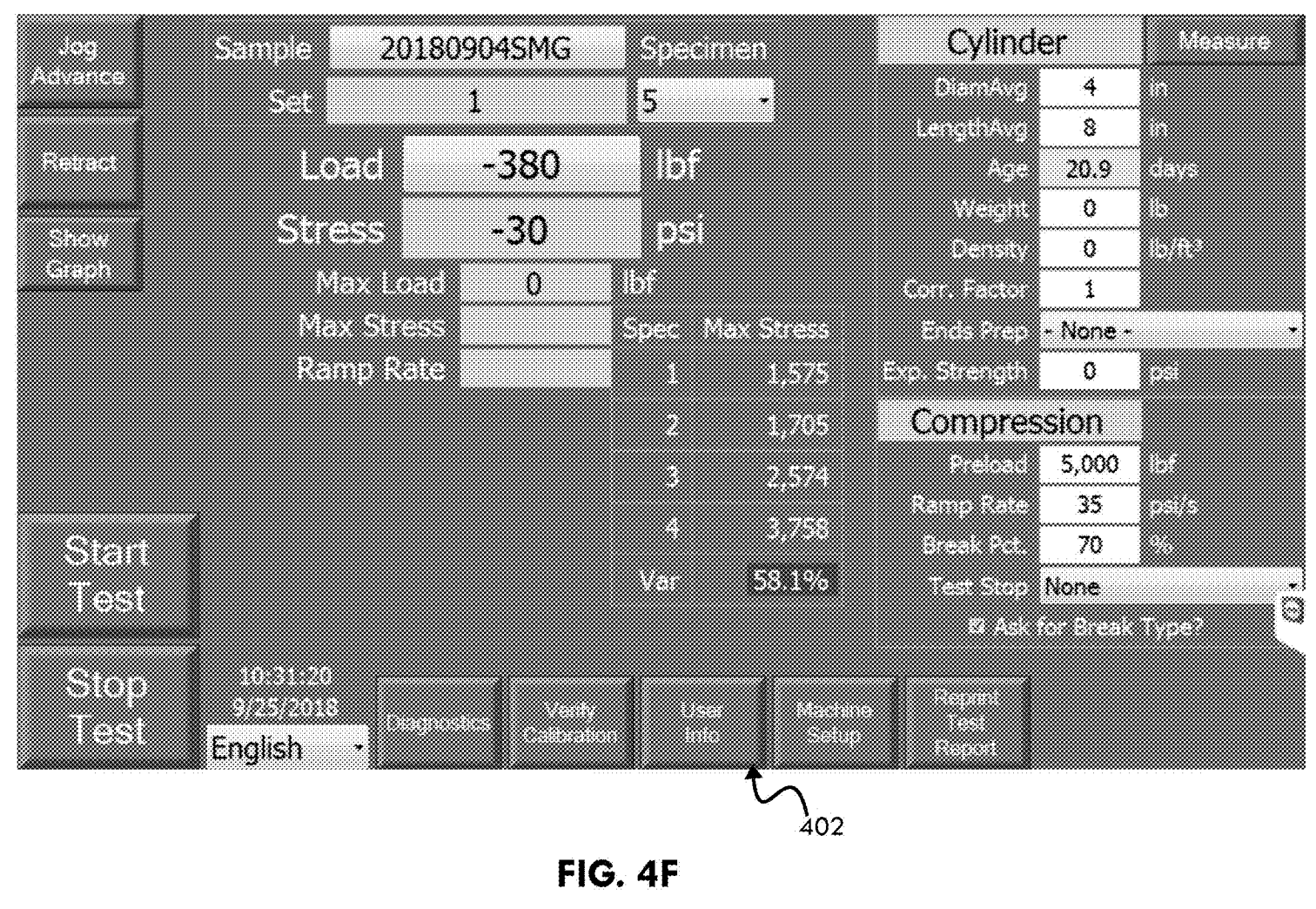

FIG. 4F shows the main control interface 402 in which the test results from previously tested sample specimens within the currently selected set of specimens is shown. In addition, the variance ("Var") among the results of those specimens is displayed. In this case, the variance is color coded red or another color to indicate that this set of specimens is outside of the corresponding specification for variance among specimens within the same set. In non-limiting embodiments, the testing machine has the capability to compare test data among multiple specimens using current specimen data and historical test data. It will be appreciated that other arrangements are possible.

It will be appreciated that the GUIs shown in FIGS. 4A-4F may be arranged in various ways and that, in some non-limiting embodiments, the selectable options available on the GUIs may be made available on a single or multiple GUIs.

Figure 5A:
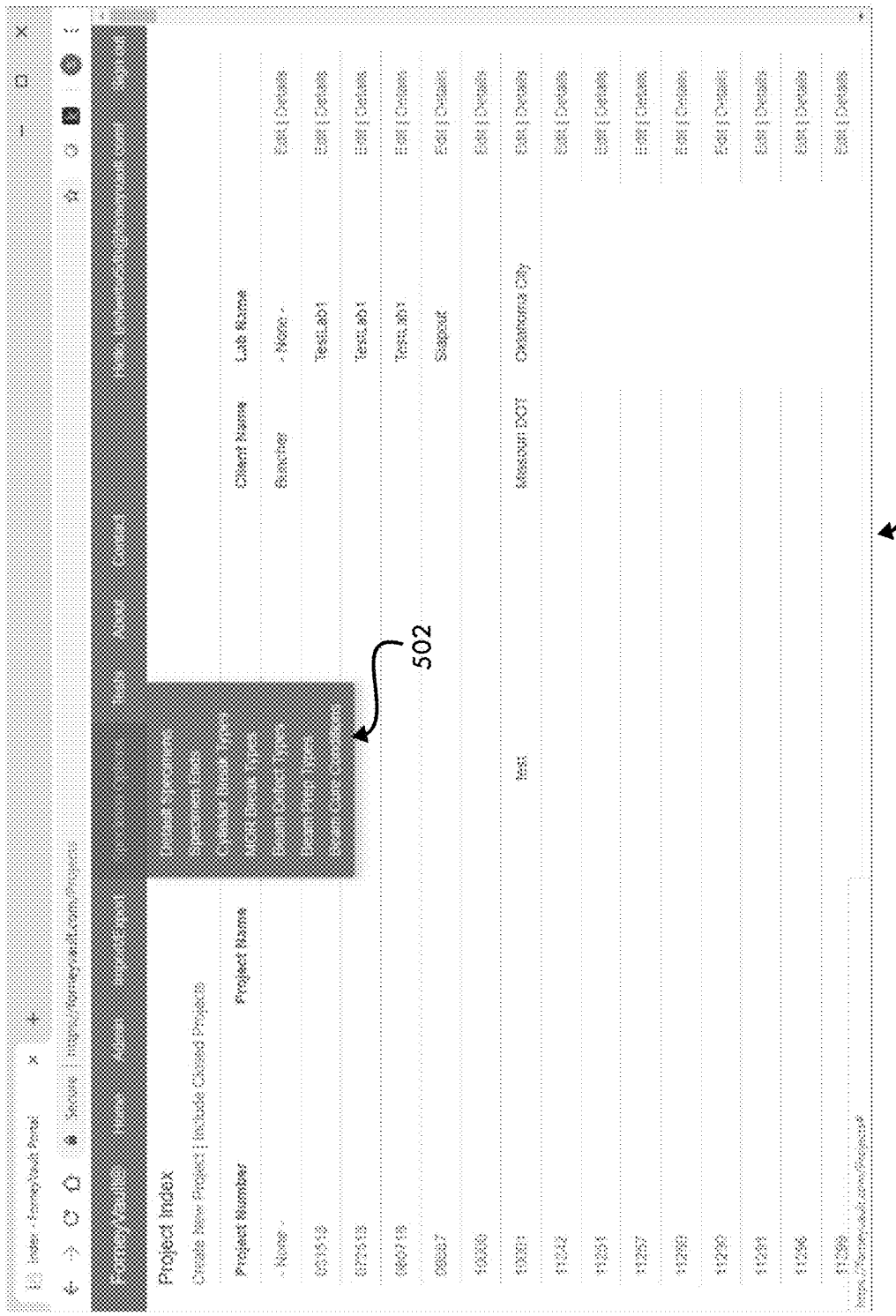
FIGS. 5A-5E illustrate graphical user interfaces for accessing test data over a secure server according to non-limiting embodiments.

Referring to FIGS. 5A-5E, graphical user interfaces (GUIs) for a portal for accessing test data from a secure server are shown according to non-limiting embodiments. The GUIs shown in FIGS. 5A-5E may be displayed by the client device 104 and GUI 102 of the client device 104 shown in FIG. 1 or by any other display device in communication with a server computer 106 having access to test data. The GUIs in FIGS. 5A-5E may be displayed, for example, as one or more webpages or screens of a software application. FIG. 5A shows a main portal interface 500 including a list of projects associated with test data. The main portal interface 500 also includes selectable options, such as hypertext links, drop-down menus, and the like. It will be appreciated that various other selectable options may be provided to facilitate users to access and view the test data, export the test data, generate reports of the test data, and/or the like. For example, one or more buttons, checkboxes, tabs, pop-up windows, and/or input boxes may be provided on the main portal interface 500 or other GUIs shown in FIGS. 5A-5E. FIG. 5A also shows a specimen options menu 502 that allows a user to select specific options for viewing specific portions of the test data.

Figure 5B:
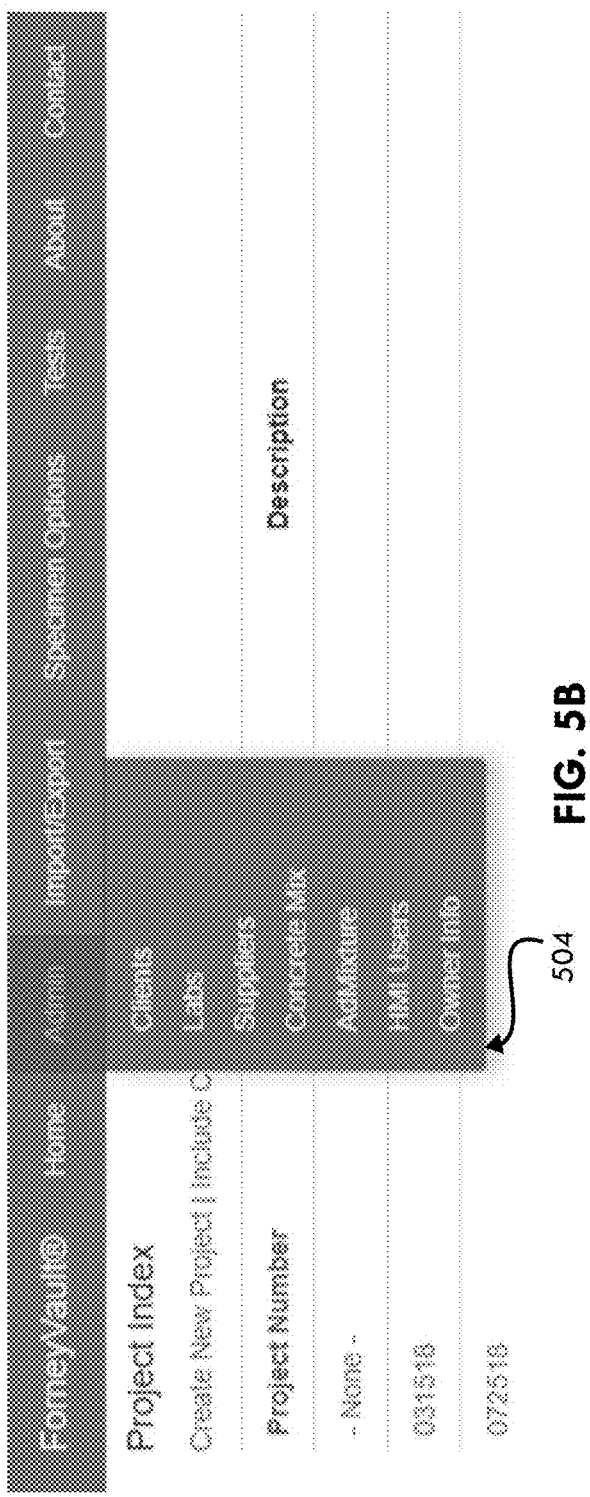
Figure 5C:
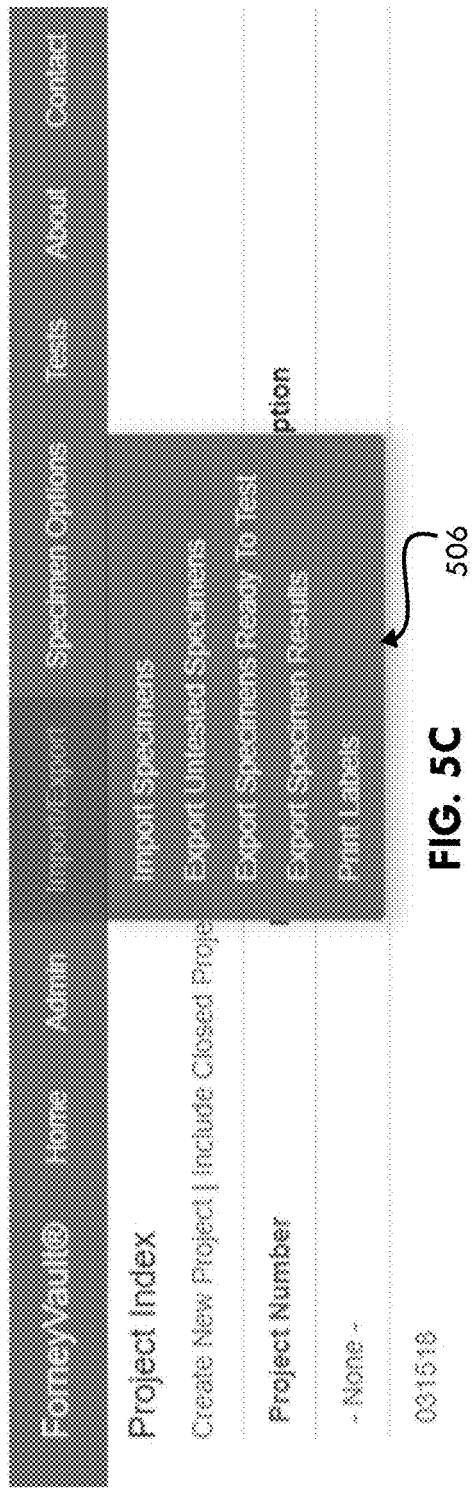
Figure 5D:
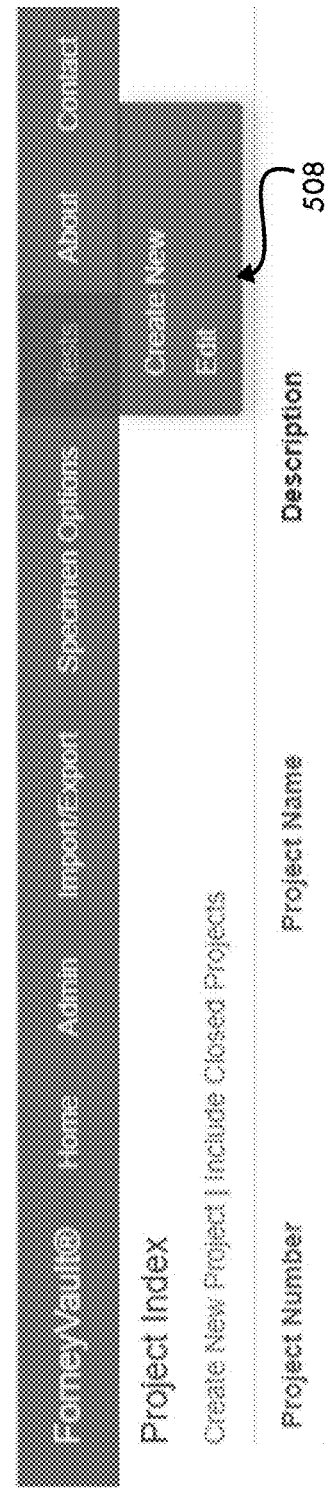
Figure 5E:
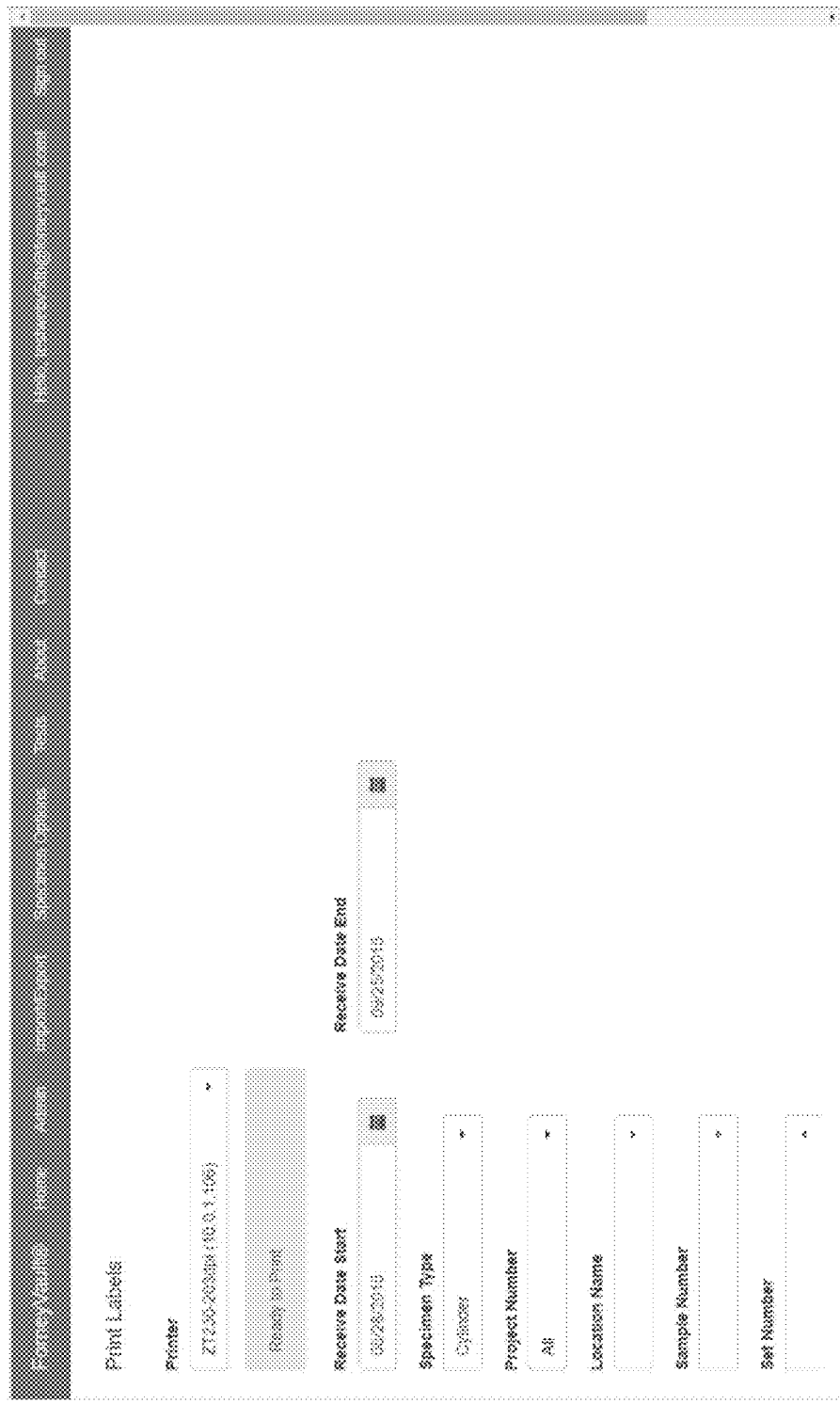

Referring now to FIGS. 5B-5D, menus 504, 506, 508 are shown from the main portal interface 500 shown in FIG. 5A. In FIG. 5B, the administrative menu 504 allows a user to add, delete, or edit clients, laboratories, suppliers, concrete mixes, and/or other parameters relating to aspects of sample specimen(s) to be tested. The data that can be interacted with and manipulated on the administrative menu 504 may be assigned to specific projects, locations, or samples by a user. In FIG. 5C, the import/export menu 506 allows a user to import and export test data by various parameters. In FIG. 5D, the tests menu 508 allows a user to create a new test or to edit an existing test. FIG. 5E shows a label interface 510 that facilitates a user to create labels for specimens that are to be tested. In non-limiting embodiments, the labels may display test data in plaintext and/or as encoded in one or more data carriers, such as a barcode.

Figure 6A:
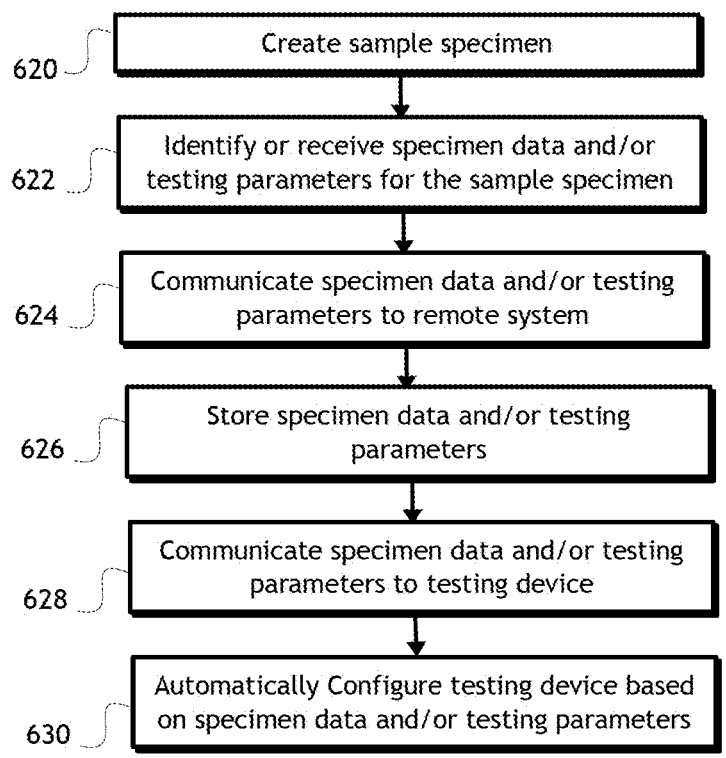
FIGS. 6A-6B illustrate methods for verifiable materials testing according to non-limiting embodiments.

Referring now to FIG. 6A, a method is shown for verifiable materials testing according to a non-limiting embodiment. At a first step 620, one or more sample specimens are created. As an example, in non-limiting embodiments, a concrete cylinder may be formed using known materials having known properties. At step 622, specimen data concerning the sample specimen(s) and/or testing parameters concerning one or more tests to be performed on the sample specimen(s) is identified or received. As an example, a user may input or select specimen data and/or testing parameters through a portal having a GUI with selectable options. At step 624, the specimen data and/or testing parameters may be communicated to a remote system. In some non-limiting examples, step 624 may overlap with step 622 in that the GUI through which the specimen data and/or testing parameters are input or selected may be a GUI hosted by the remote system through a network environment. At step 626, the remote system stores the received specimen data and/or testing parameters in a data storage device that is accessible through the remote system through a network environment. At step 628, the specimen data and/or testing parameters are communicated to one or more testing devices. For example, the specimen data and/or testing parameters may be associated with a device identifier for a testing device. At step 630, the testing device may automatically configure itself based on the specimen data and/or testing parameters.

Figure 6B:
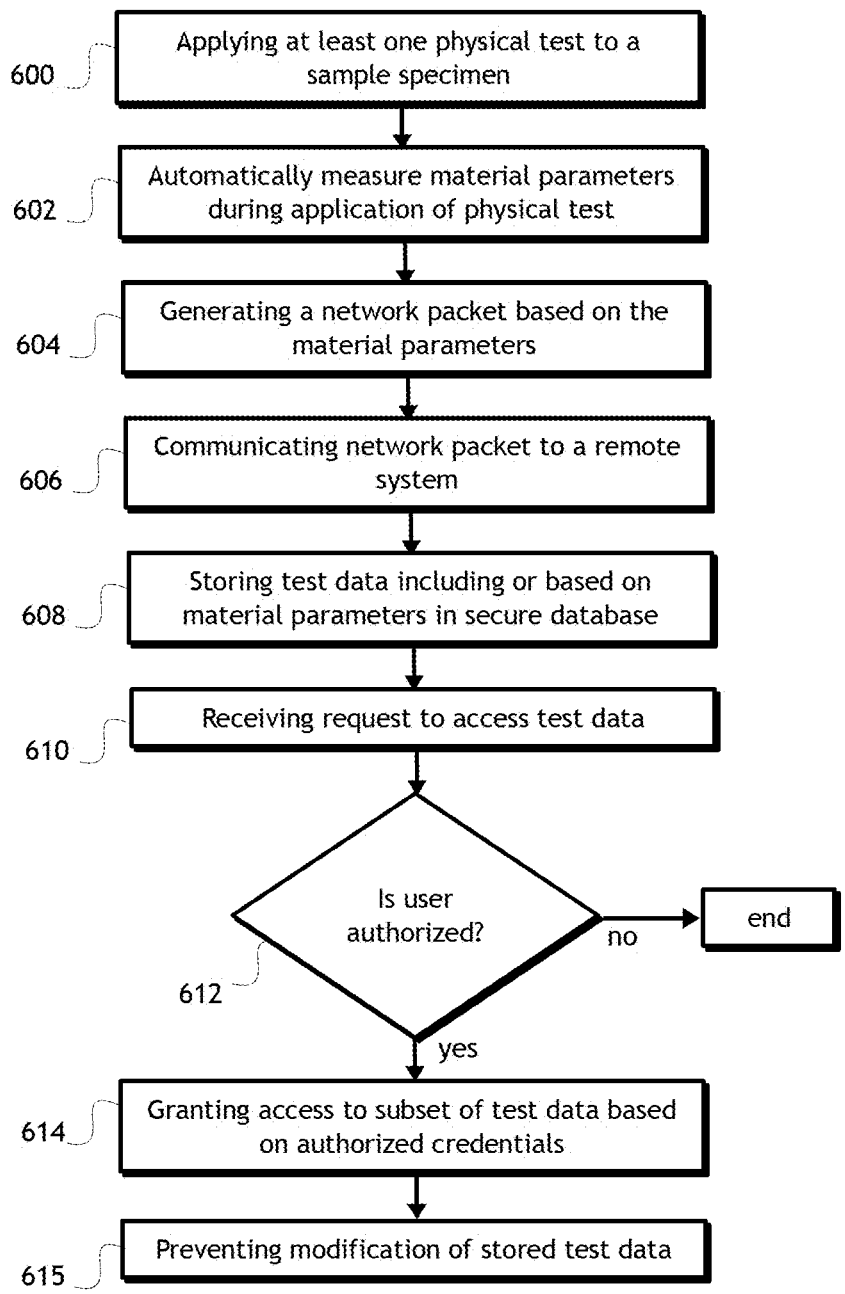

Referring now to FIG. 6B, a method is shown for verifiable materials testing according to a non-limiting embodiment. In some non-limiting examples, the method shown in FIG. 6B may continue from the method shown in FIG. 6A. At a first step 600, at least one physical test is applied to a sample specimen with a testing device. As described herein, a testing device may apply any type of excitement to a sample specimen, which may include a concrete cylinder or any other material of various sizes and shapes. At step 602, material parameters of the sample specimen are measured during the application of force by the testing device. For example, one or more sensors may measure a breaking force, a breaking time, and/or the like of a specimen sample. At step 604, one or more network packets are generated based on the material parameters measured at step 602 and/or other test data, such as testing parameters associated with the tests that resulted in the material parameters. For example, test data including the material parameters and other associated information may be stored in one or more data structures that are packaged as network packets for communication. At step 606, the one or more network packets are communicated to a remote system, such as a remote server computer. In non-limiting embodiments, the test data may be communicated directly from the testing device to the remote system, although it will be appreciated that the data may also be routed and/or relayed through one or more other systems or devices.

With continued reference to FIG. 6B, at a next step 608, test data is stored in a database in a secure data storage device. In non-limiting embodiments, test data may be stored such that it is read-only and cannot be modified (e.g., edited, deleted, updated, etc.). For example, the test data may be stored in read-only sectors of the file system of a secure data storage device, may be stored with controlled access such that modification is prohibited, and/or may be stored in encrypted form such that modification of the underlying data is not possible without access to one or more encryption keys. It will be appreciated that other arrangements are possible. At step 610, a server computer controlling access to the test data stored in the secure data storage device receives a request to access the test data. At step 612, the server computer determines if the request received at step 610 came from an authorized user. For example, the server computer may determine if the request is authorized based on a device identifier, user identifier, user credential, and/or the like. If the user is not authorized the method ends and a notification may be displayed to the user. If the user is authorized at step 612, the method proceeds to step 614.

Still referring to FIG. 6B, at step 614 the server computer grants access to test data based on the authorized credentials. For example, the server computer may grant access to a subset of test data that the user is authorized to view, such as test data associated with one or more user identifiers, facility identifiers, testing device identifiers, and/or other parameter(s) identifying the test data. At step 614, the authorized user may request and/or generate reports based on the test data and other parameters identified by the user. At step 615, the server computer prevents modification of the stored test data. As explained above, preventing modification of the test data may include, as examples, restricting read/write access based on user credentials, storing the test data in read-only sectors of the file system, or storing the test data in encrypted form such that modification of the underlying data is not possible without one or more encryption keys. In non-limiting embodiments, users associated with the test data, such as owners or employees of testing facilities, owners of testing devices, customers of testing facilities, and/or other entities involved in the development of the tested material or in performing the tests on the material may not be able to modify the test data once it is stored. In this manner, the test data may be audited for regulatory compliance or other purposes.

Figure 7:
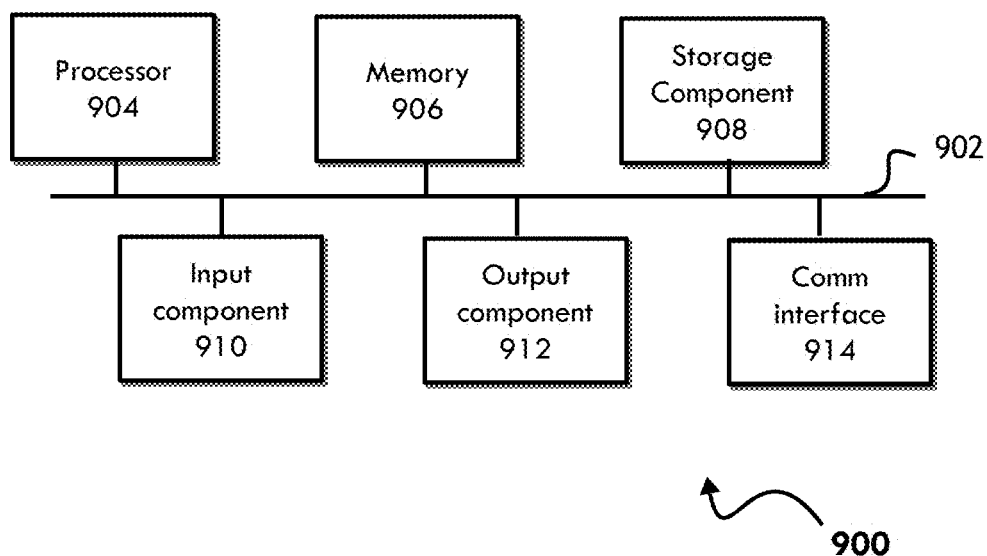
FIG. 7 illustrates example components of a device used in connection with non-limiting embodiments.

Referring now to FIG. 7, shown is a diagram of example components of a device 900 according to non-limiting embodiments. Device 900 may correspond to the client system 104, server computer 106, and/or testing device 110, 112 shown in FIG. 1, the server computer 214 and/or testing device 200 shown in FIG. 2, and/or the client device 304, LIMS 310, server computer 314, and/or testing device 300 shown in FIG. 3. In some non-limiting embodiments, such systems or devices may include at least one device 900 and/or at least one component of device 900. The number and arrangement of components shown in FIG. 7 are provided as an example. In some non-limiting embodiments, device 900 may include additional components, fewer components, different components, or differently arranged components than those shown in FIG. 7. Additionally, or alternatively, a set of components (e.g., one or more components) of device 900 may perform one or more functions described as being performed by another set of components of device 900.

As shown in FIG. 7, device 900 may include a bus 902, a processor 904, memory 906, a storage component 908, an input component 910, an output component 912, and a communication interface 914. Bus 902 may include a component that permits communication among the components of device 900. In some non-limiting embodiments, processor 904 may be implemented in hardware, firmware, or a combination of hardware and software. For example, processor 904 may include a processor (e.g., a central processing unit (CPU), a graphics processing unit (GPU), an accelerated processing unit (APU), etc.), a microprocessor, a digital signal processor (DSP), and/or any processing component (e.g., a field-programmable gate array (FPGA), an application-specific integrated circuit (ASIC), etc.) that can be programmed to perform a function. Memory 906 may include random access memory (RAM), read only memory (ROM), and/or another type of dynamic or static storage device (e.g., flash memory, magnetic memory, optical memory, etc.) that stores information and/or instructions for use by processor 904.

With continued reference to FIG. 7, storage component 908 may store information and/or software related to the operation and use of device 900. For example, storage component 908 may include a hard disk (e.g., a magnetic disk, an optical disk, a magneto-optic disk, a solid state disk, etc.) and/or another type of computer-readable medium. Input component 910 may include a component that permits device 900 to receive information, such as via user input (e.g., a touch screen display, a keyboard, a keypad, a mouse, a button, a switch, a microphone, etc.). Additionally, or alternatively, input component 910 may include a sensor for sensing information (e.g., a global positioning system (GPS) component, an accelerometer, a gyroscope, an actuator, etc.). Output component 912 may include a component that provides output information from device 900 (e.g., a display, a speaker, one or more light-emitting diodes (LEDs), etc.). Communication interface 914 may include a transceiver-like component (e.g., a transceiver, a separate receiver and transmitter, etc.) that enables device 900 to communicate with other devices, such as via a wired connection, a wireless connection, or a combination of wired and wireless connections. Communication interface 914 may permit device 900 to receive information from another device and/or provide information to another device. For example, communication interface 914 may include an Ethernet interface, an optical interface, a coaxial interface, an infrared interface, a radio frequency (RF) interface, a universal serial bus (USB) interface, a Wi-Fi® interface, a cellular network interface, and/or the like.

Device 900 may perform one or more processes described herein. Device 900 may perform these processes based on processor 904 executing software instructions stored by a computer-readable medium, such as memory 906 and/or storage component 908. A computer-readable medium may include any non-transitory memory device. A memory device includes memory space located inside of a single physical storage device or memory space spread across multiple physical storage devices. Software instructions may be read into memory 906 and/or storage component 908 from another computer-readable medium or from another device via communication interface 914. When executed, software instructions stored in memory 906 and/or storage component 908 may cause processor 904 to perform one or more processes described herein. Additionally, or alternatively, hardwired circuitry may be used in place of or in combination with software instructions to perform one or more processes described herein. Thus, embodiments described herein are not limited to any specific combination of hardware circuitry and software. The term "programmed or configured," as used herein, refers to an arrangement of software, hardware circuitry, or any combination thereof on one or more devices.

Although the invention has been described in detail for the purpose of illustration based on what is currently considered to be the most practical and preferred embodiments, it is to be understood that such detail is solely for that purpose and that the invention is not limited to the disclosed embodiments, but, on the contrary, is intended to cover modifications and equivalent arrangements that are within the spirit and scope of the appended claims. For example, it is to be understood that the present invention contemplates that, to the extent possible, one or more features of any embodiment can be combined with one or more features of any other embodiment.

The invention claimed is:

1. A system for testing a material allowing forensic analysis of test results for one or more sample specimens, comprising:
　at least one server computer; and
　a plurality of testing devices remote from the at least one server computer and in communication with the at least one server computer, each testing device of the plurality of testing devices configured to apply at least one physical test to a piece of material comprising material properties, each testing device comprising:
　　a plurality of sensors configured to measure parameters of the material subjected to the at least one physical test; and
　　at least one processor programmed or configured to: select or receive a selection of a test specimen comprising the material, communicate specimen data to the at least one server computer based on the selection of the test specimen, receive input data from the at least one server computer comprising testing parameter data based on the specimen data, automatically configure itself for at least one test based on the input data, generate test data based at least partially on the parameters of the material measured by the plurality of sensors and specimen data associated with the material, and communicate the test data to the at least one server computer;
　wherein the at least one server computer is programmed or configured to: receive the test data from a plurality of tests performed by the plurality of testing devices, store the test data from the plurality of tests in a database in association with identifiers that uniquely identify the plurality of testing devices, prevent modification of the test data stored in the database, receive specimen data associated with the test specimen from a testing device of the plurality of testing devices, and communicate the testing parameter data from the database based on the specimen data.

2. The system of claim 1, wherein the at least one server computer is further configured to: generate at least one report based at least partially on the test data.

3. The system of claim 2, wherein the at least one report comprises at least one machine-readable indicia, and wherein the at least one machine-readable indicia comprises a link to a portal providing access to the at least one report and/or the test data.

4. The system of claim 1, wherein the test data comprises at least one of the following: raw sensor data, processed sensor data, a material property of the material, a testing parameter, or any combination thereof.

5. The system of claim 1, wherein the test data comprises at least one material property of the material and at least one testing parameter, and wherein the at least one testing parameter comprises: a time period, a force, a temperature, or any combination thereof.

6. The system of claim 1, wherein the at least one server computer is further programmed or configured to provide access to the test data only to users having valid credentials.

7. The system of claim 1, wherein the at least one server computer is further programmed or configured to prevent modification of the test data.

8. The system of claim 1, wherein the at least one server computer is further programmed or configured to provide an Application Programming Interface (API) to allow access to the test data through a third-party application.

9. The system of claim 1, wherein the at least one server computer prevents modification of the test data stored in the database by preventing all users from modifying the test data or preventing users without authorized credentials from modifying the test data.

10. The system of claim 1, wherein the at least one server computer is further programmed or configured to:
　receive the input data from a client device, the input data comprising at least one of specimen data and testing parameter data;
　store the input data in the database or another database; and
　communicate the input data to the at least one processor in communication with the testing device.

11. The system of claim 1, wherein the testing device further comprises:
　a chamber adapted to receive the piece of the material;
　a piston arranged at least partially in the chamber; and a contact surface coupled to the piston and configured to apply a force to the piece of material in the chamber.

12. A testing device allowing forensic analysis of test results for one or more sample specimens, comprising:
  a chamber adapted to receive a sample specimen of a material;
  a testing mechanism arranged at least partially in the chamber and configured to apply at least one physical test to the sample specimen;
  at least one sensor arranged in the chamber and configured to detect at least one test result parameter of the sample specimen while the physical test is being applied;
  a network interface; and
  at least one processor in communication with the at least one sensor and the network interface, the at least one processor programmed or configured to:
  select or receive a selection of the sample specimen;
  communicate specimen data to a remote system based on the selection of the sample specimen;
  receive input data from the remote system via the network interface, the input data comprising testing parameter data based on the specimen data;
  automatically configure itself based on the input data;
  cause the testing mechanism to apply the physical test to the sample specimen based on the automatic configuration;
  receive the at least one test result parameter from the at least one sensor;
  generate test data comprising the at least one testing result parameter, at least one testing parameter, and at least one material parameter; and
  communicate, with the network interface, the test data to the remote system, the remote system comprising a secure data storage device such that the test data is stored as read-only and is accessible based on user credentials.

13. The testing device of claim 12, wherein the at least one processor is further programmed or configured to:
  generate a unique security identifier; and
  associate the unique security identifier with the test data before communicating the test data to the remote system.

14. A method for verifiable materials testing allowing forensic analysis of test results for one or more sample specimens, comprising:
  positioning a piece of material within a testing device of a plurality of testing devices, the piece of material comprising material properties;
  applying at least one physical test with the testing device to the piece of material;
  automatically measuring a plurality of parameters of the piece of material while the at least one physical test is being applied;
  generating at least one network packet based on the plurality of parameters;
  communicating the at least one network packet to a remote system;
  storing, by the remote system, the plurality of parameters and test data derived from the plurality of parameters in a remote secure database;
  selectively allowing access to the plurality of parameters and/or the test data from the remote secure database;
  preventing modification of the plurality of parameters and/or the test data in the remote secure database;
  receiving, by at least one other testing device of the plurality of testing devices, a selection of a test specimen;
  communicating, by the at least one other testing device, specimen data to the remote system based on the selection of the test specimen;
  receiving, by the remote system, the specimen data from the at least one other testing device;
  communicating, by the remote system, testing parameter data based on the specimen data to the at least one other testing device; and
  automatically configuring, by the at least one other testing device, a configuration of itself for applying the at least one physical test based on the testing parameter data.

15. The method of claim 14, further comprising generating at least one report based at least partially on the test data.

16. The method of claim 15, wherein the at least one report comprises at least one machine-readable indicia, and wherein the at least one machine-readable indicia comprises a link to a portal providing access to the at least one report and/or the test data.

17. The method of claim 14, wherein the test data comprises at least one of the following: raw sensor data, processed sensor data, a material property of the material, a testing parameter, or any combination thereof.

18. The method of claim 14, wherein the test data comprises at least one material property of the material and at least one testing parameter, and wherein the at least one testing parameter comprises: a time period, a force, a temperature, or any combination thereof.

19. The method of claim 14, wherein preventing modification of the plurality of parameters and/or the test data in the remote secure database comprises preventing all users from modifying the test data.

20. The method of claim 14, wherein the selection of the test specimen is input or selected by a user through a graphical user interface, wherein the specimen data comprises physical properties of the sample specimen.

21. The method of claim 14, further comprising:
  receiving test data from at least one other test from the remote system, the at least one other test corresponding to at least one sample specimen from a same set of sample specimens that includes the piece of material; and
  displaying, on at least one graphical user interface, the test data from the at least one other test.

* * * * *